March 6, 1951     C. A. CYR     2,544,378
FOG FILTER FOR HEADLIGHTS
Filed April 15, 1947
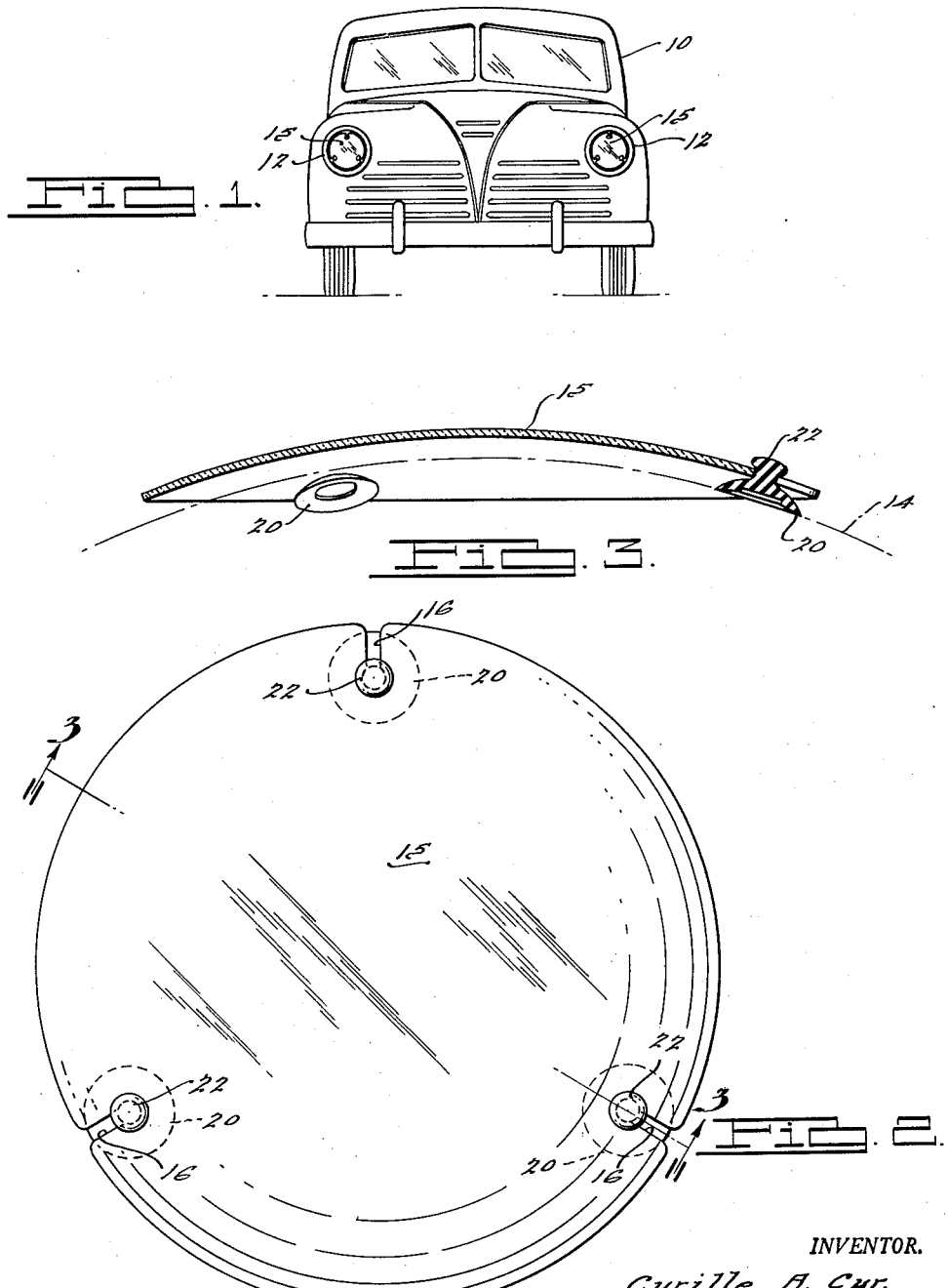
INVENTOR.
Cyrille A. Cyr.
BY Harness, Dickey & Pierce
ATTORNEYS.

Patented Mar. 6, 1951

2,544,378

UNITED STATES PATENT OFFICE 2,544,378

FOG FILTER FOR HEADLIGHTS

Cyrille A. Cyr, Detroit, Mich.

Application April 15, 1947, Serial No. 741,561

1 Claim. (Cl. 240—46.59)

The present invention relates to optical filtering devices and particularly to improved means for altering the characteristic of light emitted by the head lamps of vehicles, whereby visibility can be augmented under adverse atmospheric conditions, as in fog or rain.

It has been known for many years that visibility under conditions such that the light emitted by head lamps is diffused and reflected in the atmosphere directly in front of the vehicle, as by fog or rain, can be improved by altering the color of the light, and, also, that such visibility is improved by somewhat decreasing the intensity of the light. It has also long been known that amber or yellow light is particularly advantageous from the standpoint that it permits greater intensity before the reflection and diffusion become unduly bothersome than it is possible to use with white light or light of other colors.

Modern motor vehicles are customarily provided with sealed head lamps of standardized size and shape, each lamp having two alternatively usable filaments arranged to propagate their beams in different directions, one filament being arranged to throw a beam at a higher level than the other. Both beams are of relatively high intensity, however, and of course the lenses of such lamps are not colored, since for driving in clear weather the reduced intensity caused by coloring the lens entail a loss of efficiency. Motor cars are also commonly equipped with parking lights of very low intensity, but it is not feasible to use these for driving lamps under adverse conditions of fog and rain, since their intensity is too low. Neither is it feasible to increase the size of such parking lamps, since any such increase would create a battery drain of such proportions as to render their use impractical for parking purposes. To overcome these difficulties it has been quite common to equip vehicles with auxiliary fog lamps having colored lenses. These are of course expensive, troublesome to install, and are of relatively low efficiency in clear weather, in addition to which they are totally unnecessary under driving conditions existing 95% or more of the time, in most climates. It has also been found that if such special fog lamps are installed on the front bumper or a part of the front bumper supporting structure, as is usually the most feasible mounting place, they cannot be held in proper adjustment, since bumpers and their supporting structures are almost invariably somewhat distorted sooner or later when the bumper strikes or is used to push another vehicle, or comes up against the wall of a garage.

My invention overcomes the foregoing difficulties by apparatus which is very simple and inexpensive in character and which may be very quickly and easily applied to and removed from the regular head lamps. The regular head lamps of the vehicle are so mounted that they tend to remain accurately positioned and focused, since they are mounted relatively high on the fenders or body portions which are protected by the bumper structure and not apt to be injured or substantially distorted unless considerable damage is done to the car which would require repair in any event.

The provision of a head-lamp filter overcoming the difficulties outlined and having the advantages noted above may be considered to constitute, broadly, the object of my invention.

It is also an object of this invention to provide such filtering devices which are shaped to conform to the contour of the lenses of head lamps as commonly constructed, means being provided whereby the filtering element is held against unintended displacement, while movement of the vehicle with respect to the air increases the effectiveness of the holding means.

Other objects and advantages will become apparent upon consideration of the present disclosure in its entirety.

In the drawings:

Fig. 1 is a somewhat diagrammatic front elevational view of a passenger automobile equipped with headlight filtering means constructed in accordance with the present invention, Fig. 2 is an enlarged elevational view of one of the filter assemblies, and Fig. 3 is a cross-sectional view taken substantially on the line 3—3 of Fig. 2 and looking in the direction of the arrows, diagrammatically indicating the relative positioning of a head lamp when the filter is installed.

Referring now to the drawings, reference character 10 designates generally the body of a passenger automobile which is illustrated fragmentarily and diagrammatically and merely as typifying motor vehicles with which my invention is adapted to be used. The automobile is shown as provided with conventionally disposed head lamps 12 of the sealed-beam type. Such lamps are now commonly constructed of a uniform and standardized diameter, and the curvature of the front lens portion 14 is also standardized.

My improved filter consists of a smooth, transparent sheet 15 of a suitable plastic material which is preferably of an amber color and which may be circular in outline and of a diameter corresponding to that of the standard sealed-beam lamp lens as 14. At a plurality of peripherally spaced positions, radial slots 16 are formed in the rim of the filtering sheet 15, extending inwardly a short distance. The width of the slots may be somewhat reduced at their outer extremities, and each slot is adapted to support a suction-cup assembly 20 formed of soft rubber or the like, the cups being shown as provided with integral headed stem portions 22 held in and preferably somewhat compressed by the sidewalls of the slots.

The entire sheet 15, including the slotted peripheral portion thereof, is preferably shaped to concavo-convex contour upon a radius corresponding to that of the front surface of lens 14. Since the slotted area is shaped in this manner, the inner faces of the suction cups lie parallel or upon a plane tangent to the surface of lens 14, and when the filter is attached there is therefore no force tending to rock the cups. Thus despite the vibration of the vehicle, the suction cups may be of small size.

It will be appreciated that in order to apply my improved filtering means it is necessary only to press the suction cups 20 against the surface of the lens 14. The filter will then be held rigidly in place until the cups are individually loosened by distorting them sufficiently to admit air beneath each one and so loosen their holding effect upon the lens surface.

Filtering devices constructed in accordance with my invention occupy very little space and may easily be stored in a glove compartment or other convenient place in the car. When applied, they reduce to some extent the intensity of the light from the head lamps, which is desirable, as above indicated, without so reducing the intensity as to interfere with proper vision, while the amber tinting they impart to the light reduces the annoying effect of such diffusion and reflection as are caused by fog or rain, thereby further increasing visibility.

It will be apparent that various modifications may be made without departure from the fair field and intended scope of the subjoined claim.

I claim:

A filtering device for head lamps and the like comprising a pigmented transparent sheet formed to concavo-convex contour and having substantially parallel inner and outer surfaces, and holding means comprising a plurality of suction cups each of substantially right conoidal form, carried by convex portions of such sheet at a plurality of spaced points near the margin of the sheet, and each projecting substantially perpendicularly from a plane tangent at its point of attachment, whereby the holding portions of such cups may lie in planes substantially tangent to a correspondingly convexly contoured surface to which the filter is to be applied, the sheet being provided with slots extending inwardly from the periphery thereof and having narrowed mouth portions, the suction cup means having resilient holding stem portions retained in said slots and of a relaxed diameter exceeding that of such narrowed mouth portions.

CYRILLE A. CYR.

REFERENCES CITED

The following references are of record in the file of this patent:

UNITED STATES PATENTS

| Number | Name | Date |
| --- | --- | --- |
| 1,232,120 | Sutter | July 3, 1917 |
| 1,973,361 | Smally | Sept. 11, 1934 |
| 2,107,801 | Query | Feb. 8, 1938 |
| 2,349,853 | Ebert | May 30, 1944 |

FOREIGN PATENTS

| Number | Country | Date |
| --- | --- | --- |
| 196,515 | Switzerland | of 1938 |